March 16, 1954  C. GABRIELSEN ET AL  2,672,389
MERCHANDISING MACHINE FOR FROZEN COMESTIBLES
Filed Dec. 19, 1952  5 Sheets-Sheet 5

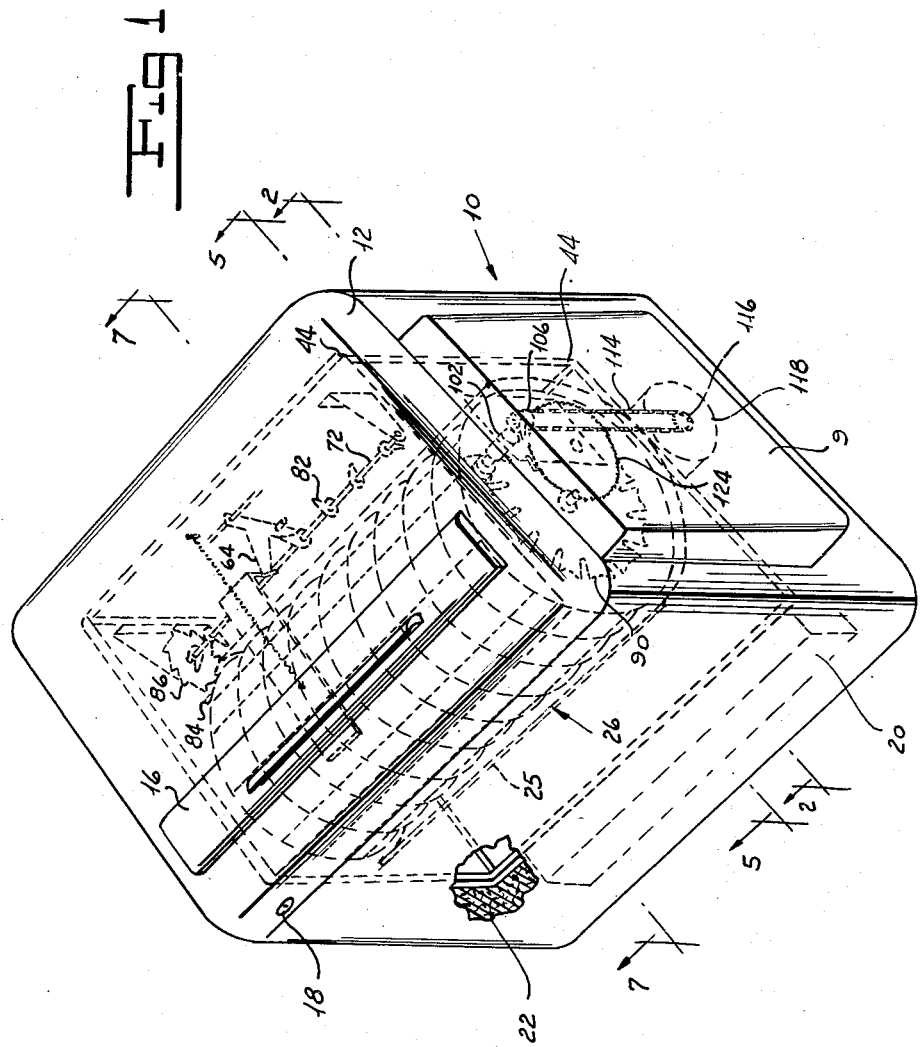

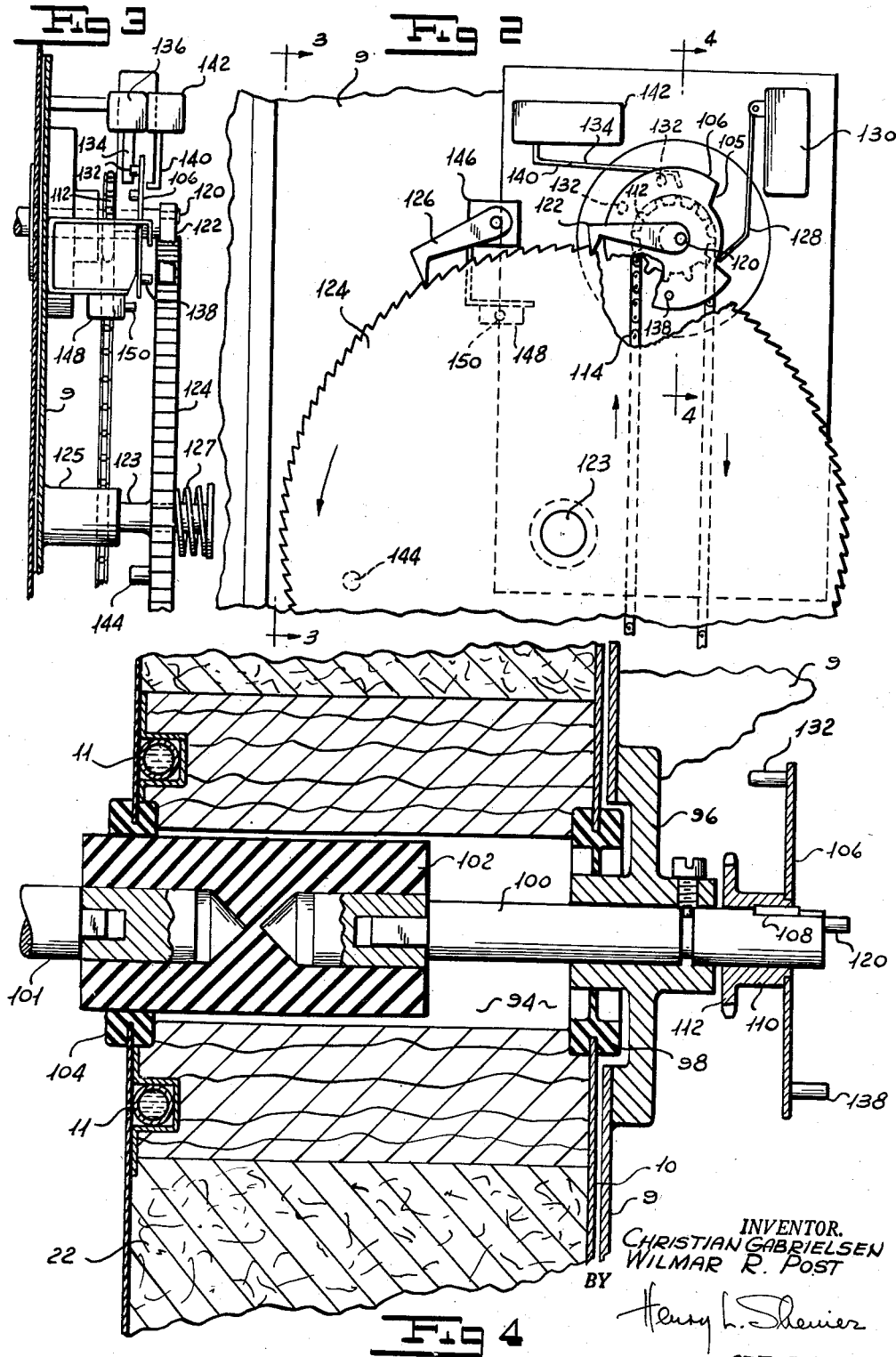

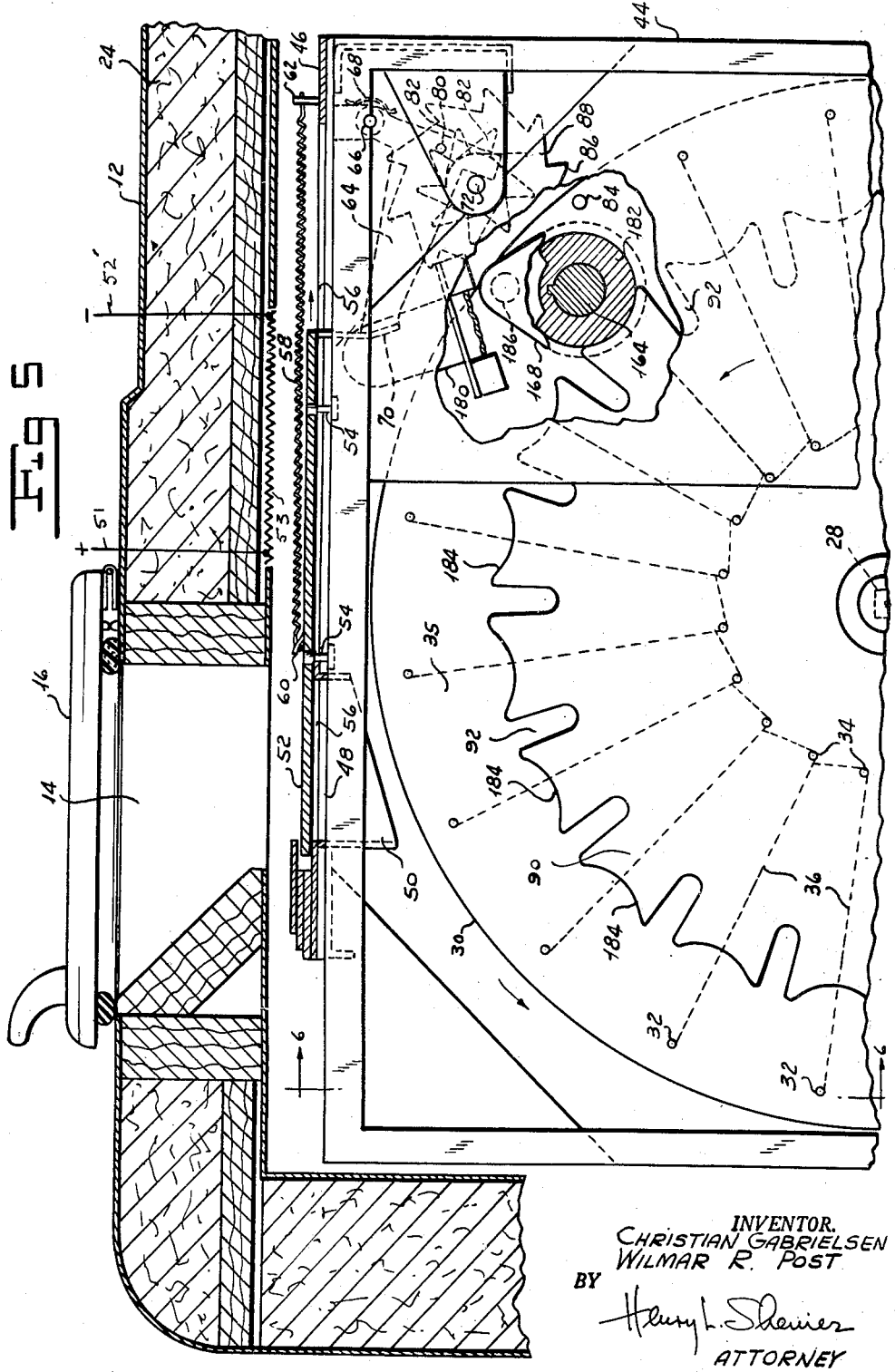

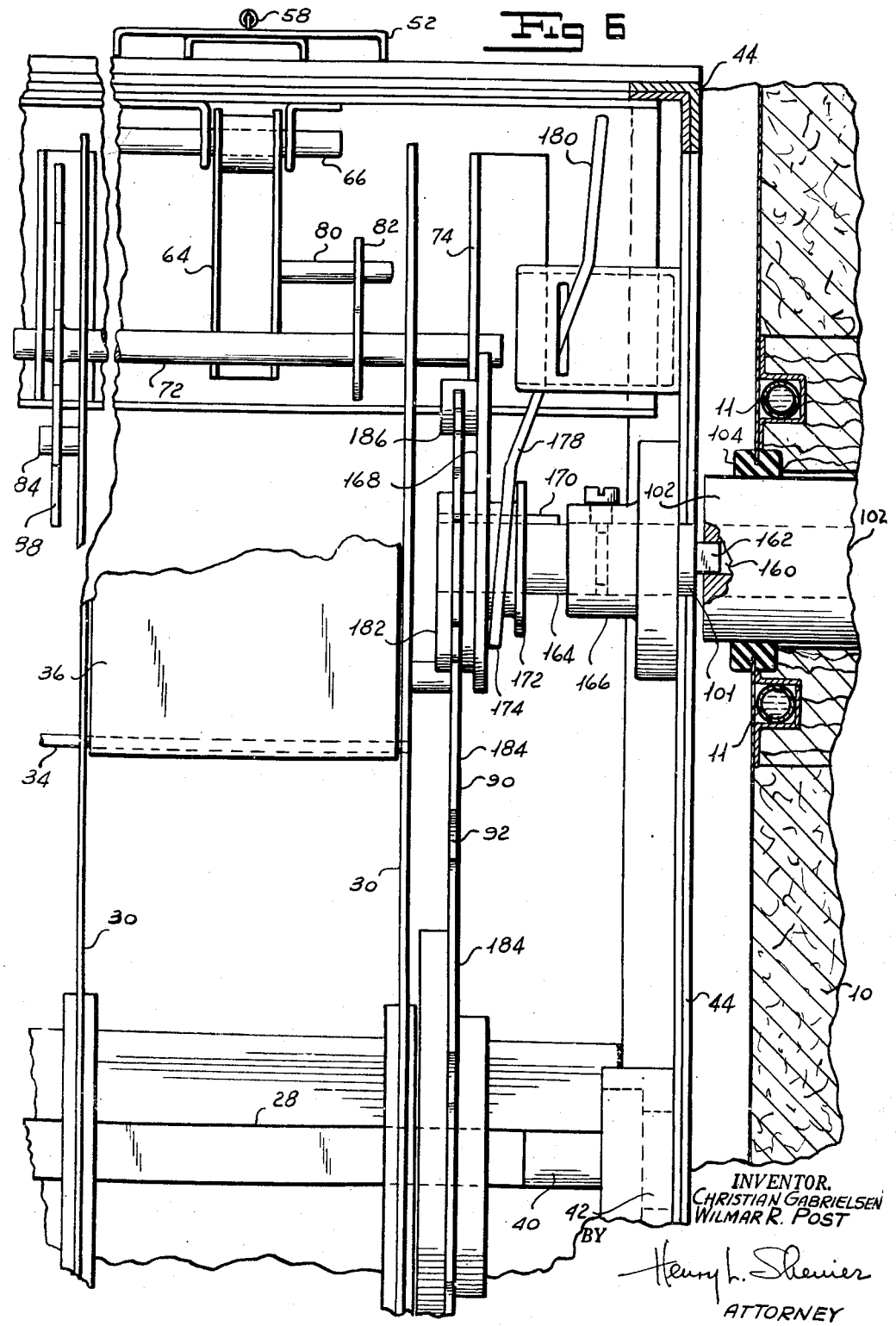

INVENTOR.
CHRISTIAN GABRIELSEN
WILMAR R. POST
BY
Henry L. Shenier
ATTORNEY

Patented Mar. 16, 1954

2,672,389

UNITED STATES PATENT OFFICE 2,672,389

MERCHANDISING MACHINE FOR FROZEN COMESTIBLES

Christian Gabrielsen, Mountain Lakes, and Wilmar R. Post, Dover, N. J., assignors to Rowe Manufacturing Co., Inc., Whippany, N. J., a corporation of New York Application December 19, 1952, Serial No. 326,980

6 Claims. (Cl. 312—97.1)

Our invention relates to an improved merchandising machine for frozen comestibles, and more particularly to a merchandising machine adapted to vend in succession a large number of frozen comestibles such as ice cream bars, "Popsicles" and the like from a refrigerated compartment.

There are many frozen comestibles available to the consuming public. These take the form of ice cream sandwiches, "Eskimo Pies," "Popsicles" and the like. A "Popsicle," for example, is ice cream provided with a confectionary coating frozen on a stick. The frozen comestible must be kept at a reduced temperature to prevent it from melting. The shapes of the articles are such that they are difficult to vend. The frozen comestible merchandising machines of the prior art are complicated and expensive devices and are adapted to vend a limited quantity of frozen comestibles. Then too, the vending machines for frozen comestibles of the prior art are difficult to load. If, for any reason, refrigeration is lost all of the frozen comestibles will melt and it becomes a difficult, time consuming and burdensome task to clean the machine.

One object of our invention is to provide an improved merchandising machine for frozen comestibles having a large capacity.

Another object of our invention is to provide an improved merchandising machine for vending frozen comestibles which is easy to load and which is convenient to clean.

A further object of our invention is to provide an improved frozen comestible merchandising machine which is inexpensive to construct and simple in operation.

Other and further objects of our invention will appear from the following description.

In general our invention contemplates the employment of a conventional deep freeze cabinet which is provided with customary refrigeration equipment to maintain a reduced temperature within the cabinet. Within the cabinet we mount a drum for rotation upon a horizontal axis. The drum is provided with a plurality of compartments adapted to receive frozen comestibles. The compartments are arranged circumferentially around the drum, there being a plurality of circles of compartments laterally spaced from each other. A series of slidable cover doors normally prevent access to the compartments. The cover doors are adapted to be released in succession as each circle of compartments is to be made available. The drum is stepped around by a driving mechanism under the control of an appropriate coin control mechanism. The arrangement is such that only one compartment is accessible from the outside. A cover for an opening having a dimension equal to the width of the compartment may be opened and a purchaser may reach in and remove the frozen comestible. Another compartment containing merchandise is not presented for access until the drum is stepped around to bring another compartment into position for removal of the merchandise.

In the accompanying drawings which form part of the instant specification and which are to be read in conjunction therewith and in which like reference numerals are used to indicate like parts in the various views:

Figure 1 is a perspective view showing a merchandising machine for frozen comestibles containing one embodiment of our invention.

Figure 2 is a fragmentary sectional view drawn on an enlarged scale viewed along the plane 2—2 of Figure 1 showing a portion of the control mechanism for initiating the vending cycle and stopping it.

Figure 3 is a sectional view taken along the line 3—3 of Figure 2.

Figure 4 is a sectional view drawn on an enlarged scale taken along the line 4—4 of Figure 2 with parts of the mechanism removed for clarity.

Figure 5 is a fragmentary sectional view with parts broken away, drawn on an enlarged scale taken along the plane 5—5 of Figure 1.

Figure 6 is a sectional elevation taken along the line 6—6 of Figure 5.

Figure 7:
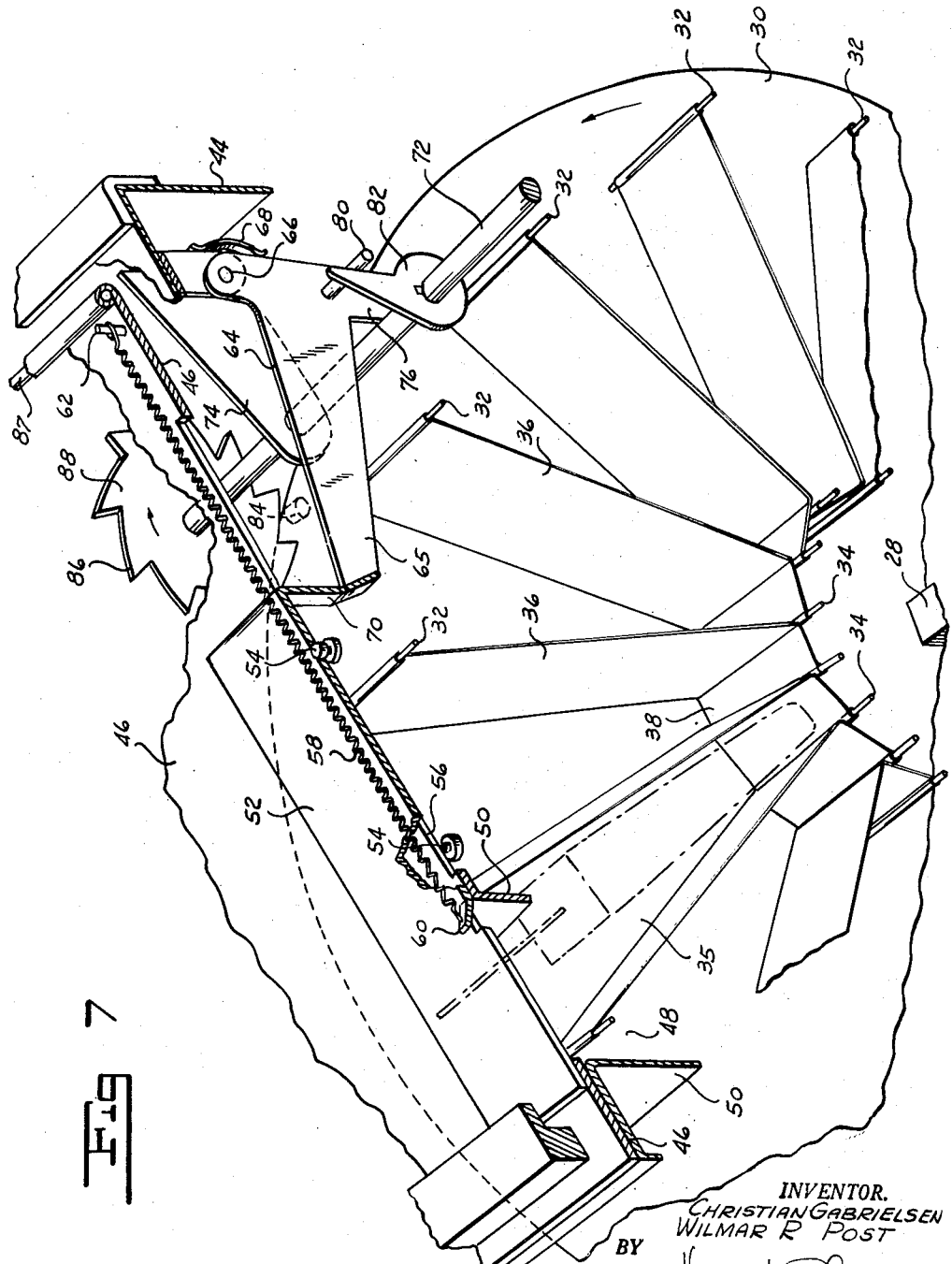
Figure 7 is a fragmentary sectional perspective view taken along the line 7—7 of Figure 1 drawn on an enlarged scale.

More particularly, referring now to the drawings, the merchandising machine is housed in a cabinet indicated generally by the reference numeral 10. The cabinet may be any conventional deep freeze cabinet provided with a cover 12. The cover is formed with an opening 14 shown in Figure 5 which is normally closed by a hinged lid 16 giving access to the interior of the cabinet. The cover 12 is securely locked to the cabinet by means of a lock 18. The lid 16 can be lifted at will. The cabinet is provided with the customary refrigeration equipment 20 which is not shown in detail since it forms no part of the instant specification. The entire cabinet is provided with insulation 22, as is well known in the art. The cover 12 is likewise provided with insulation 24 in order to prevent rapid heat exchange and to prevent heat from flowing easily to the interior of the compartment. A drum indicated generally by the reference numeral 26 is mounted upon a horizontal axis for rotation within the compartment. The drum is formed by a shaft 28 which is of square cross section intermediate its ends. Mounted on the shaft 28 we provide a plurality of circular disks 30. The disks are spaced from each other by the desired width of the compartments. A plurality of transversely extending wires 32 pass through the disks parallel to the axis of the shaft 28. A second plurality of wires 34 pass through the disks 30 parallel to the axis of shaft 28 and spaced from the wires 32 along radial planes. The distance between a wire 32 and its corresponding wire 34 defines the depth of each compartment. The circular displacement of one wire 34 from its adjacent wire 34 defines the width of the bottom of the compartment and the distance between one wire 32 and adjacent wire 32 defines the width of the compartment at the outer end thereof. In a typical case we find that we may conveniently have twenty compartments spaced peripherally around the shaft and we may have ten circles of compartments, thus giving us a capacity of two hundred compartments. The radial boundaries of the compartments are formed by metal sheets 36 which extend radially between a wire 32 and a companion wire 34. The sheets 36 are formed with a bottom flange 38 to form the bottom of the compartment. Advantageously, as can readily be seen by reference to Figure 7, the upper portion of a sheet 36 is secured to one wire 32 and the end of its flange 38 secured to a radially adjacent inner wire 34.

The ends of shaft 28 are formed with circular portions 40, as can be seen by reference to Figure 6, which are rotatably mounted in suitable bearings 42 carried by a frame 44 which rests within the interior of the cabinet 10. The top of frame 44 is covered by a panel 46 formed with a plurality of openings 48 disposed underneath the cover opening 14. There is one opening 48 positioned over each circular row of compartments. The opening 48 is provided with a downwardly extending baffle 50 which surrounds the opening and prevents manual access to the compartment in front of and in back of the opening as well as to each side of the opening into adjacent circles of compartments. As can be seen by reference to Figure 5, if the lid 16 were opened a hand could be reached through the openings 14 and 48 into the compartment 35 shown directly under the opening 48. An article in compartment 35 can readily be removed manually.

Each opening 48 but the end one is adapted to be covered by a sliding cover 52, as can readily be seen by reference to Figures 5 and 7. Each cover 52 is provided with a pair of pins 54 which extend through a guide slot 56 formed in the panel 46. One end of a spring 58 is secured to a projection 60 formed on the cover 52. The other end of the spring 58 is secured to a pin 62 carried by the panel 46. The spring normally biases each cover to move to the right, as viewed in Figures 5 and 7. We provide a latch for each cover normally holding it in closed position against the action of the spring. The latch 64 is pivoted about pin 66 carried by the frame 44. A leaf spring 68 normally biases the latch 64 to rotate in a clockwise direction, as viewed in Figure 7, which spring is adapted to bring the toe 65 of the latch 64 behind a depending portion 70 formed integrally with the cover. A camshaft 72 is carried from brackets 74 supported by the frame 44. The lower end of latch 64 is formed with a depending portion 76 adapted to contact the camshaft 72 and thus limit the clockwise motion of the latch 64 under the influence of the spring 68 to position the latch correctly behind the dependent stop 70 of the cover. It is to be understood, of course, that there is a latch 64 for each cover and that there is a cover for each circular row of compartments except the first, or right-hand one. Each latch 64 is formed with a horizontally extending pin 80 which is in the path of travel of a cam 82 which is secured to the camshaft 72 for rotation therewith. There is one cam 82 for each latch 64.

The drive mechanism for the drum which will be described more fully hereinafter is adapted to rotate the drum in a counterclockwise direction, as viewed in Figures 5 and 7. The end of the drum carries a projecting pin 84 which can be seen readily in Figures 6 and 7. The pin 84 is mounted near the periphery of the drum adjacent the teeth 86 of a ratchet wheel 88 which is secured to the camshaft 72 for rotation therewith. Once for each rotation of the drum the ratchet wheel 88 will be rotated through one tooth. In the case we are assuming, namely that there are ten circular rows of compartments, there will be nine cams 82, one for each row of compartments but the first. It is not necessary to provide a cover for the first or end circular row of compartments, preferably the row at the right-hand end since this is the first circular row of compartments to be made available for dispensing. The cams 82 will be displaced from each other around the camshaft 72 40°, as can be seen by reference to Figure 5. In this manner successive latches 64 will be depressed to permit the covers to spring back at successive rotations of the drum. Stated differently, after the drum revolves once the first cam 82 will trip the first cover latch and make the second circular row of compartments available. After this row of compartments has been exposed successively for successive vending operations it will become exhausted, when the next compartment has been presented to the dispensing opening. On the next operation of the machine the rotation of the drum will cause the pin 84 to engage the ratchet tooth 86 of the ratchet wheel to rotate the second cam which coacts with the third row of compartments to trip the cover for the third row, thus making the first compartment of the third row available. The operation proceeds in succession until all of the covers have been tripped.

It is to be understood that the interior of the cabinet 10 is maintained at a low temperature by expanded refrigerant fluid from the refrigeration apparatus (not shown) passing through the cooling coils 11 which are shown in Figures 4 and 6.

The drum shaft 28 has secured thereto for rotation therewith a Geneva wheel 90, there being one slot 92 for each compartment. In the case we are discussing, that is, for a drum having rows with twenty compartments to each row, there will be twenty slots 92 in the Geneva wheel 90.

By reference to Figure 1 it will be observed that there is a casing 9 attached to the outside of cabinet 10. The control mechanism and the transmission for the drive mechanism for the drum are housed in the casing 9.

Referring now to Figure 4, the insulated wall of the cabinet 10 is provided with a bore 94 through which the drive shaft for driving the drum is adapted to pass. The casing 9 carries a bearing 96 in which a drive shaft 100 is rotatably mounted. A sealing ring 98 carried by the wall of the cabinet 10 seals one end of the bore 94. The drive shaft 100 is coupled to a plastic coupling 102, the other end of which is coupled to a second drive shaft 101. The drive shaft 101 is in the freezing compartment and will be at a low temperature. The plastic coupling 102 has a low coefficient of heat conduction so that frost and condensation upon the external portion of the drive shaft 100 will not form. A sealing ring 104 seals the inner end of the bore 94 around the plastic coupling 102.

A cam 106 is keyed to the outer end of shaft 100 by key 108. The cam is formed with a hub 110 with which a sprocket wheel 112 is integral. A sprocket chain 114 extends around the sprocket wheel 112 downwardly to a drive sprocket 116 carried by the shaft of a motor 118, as can be seen by reference to Figure 1. Whenever the motor 118 runs it will rotate the drive shaft 100 through the sprocket wheel 112 and at the same time rotate cam 106. The end of shaft 100 is formed with a small eccentric shaft 120 around which a pawl 122 is pivoted. The pawl 122 normally engages a tooth of a ratchet wheel 124. The ratchet wheel 124 is rotatably mounted upon a shaft 123 which is carried by a support 125 secured to the casing 9. A spring 127 normally urges the ratchet wheel to the position shown in Figure 3. The ratchet wheel may be moved against the action of the spring to disengage it from the pawls. Whenever the shaft 100 rotates the eccentric shaft 120 will oscillate the pawl 122. The arrangement is such that for each rotation of the drive shaft 100 the pawl 122 will step the ratchet wheel 124 around one tooth. A stationary pawl 126 is adapted to prevent the ratchet wheel 124 from drifting around in a clockwise direction during the retraction of the driving pawl 122.

It is to be understood that any appropriate coin control mechanism may be employed, preferably one which will give change. An appropriate coin register is one shown in copending application of Christian Gabrielsen and John F. Morrison, Serial No. 166,045, filed June 3, 1950. The coin register forms no part of the instant specification. The arrangement is such that when coins are deposited in the coin register which may be located in any suitable place within casing 9, a circuit is made which operates the motor 118, rotating the shaft 100 in a clockwise direction, as viewed in Figure 2. The cam in rotating will contact arm 128 of a switch 130. The function of switch 130 is to maintain the motor energized after the coins have left the coin register and to insure that a complete cycle of operations will occur. The cam 106 carries a plurality of pins. The pins 132 are adapted to coact with an arm 134 to operate switch 136 for an appropriate change mechanism (not shown). The pin 138 is adapted to coact with an arm 140 of another switch 142 for de-energizing the change maker. It is to be understood that any appropriate change maker known to the prior art may be operated from switches 136 and 142. After the cam has completed one rotation the arm 128 will arrive at the cutout portion 105 of the cam and permit the circuit to be broken through switch 130, stopping the operation of the motor.

It will thus be seen that when coins are deposited in the coin register the motor is permitted to run to drive the drive shaft through 360° under the control of a cam 106. During this rotation a change-making switch will be operated by the pins carried by the cam. Furthermore, the pawl 122 will step the ratchet wheel around in a counterclockwise direction through one tooth. The ratchet wheel in effect is a counter. In the case we are discussing there will be two hundred teeth on the ratchet wheel, one for each compartment. The ratchet wheel carries a pin 144 which projects inwardly from the wheel 124, as can be seen by reference to Figure 3. The bracket 146 which carries the stop pawl 126 supports a switch 148 provided with an arm 150. The arm 150 is positioned in the path of travel of the pin 144. When this pin contacts the arm 150 it will operate the switch 148 to break the circuit through the motor 118. The parts are positioned so this will occur after the last compartment of the last row is moved into register with the lid opening 14. The switch 148 can, as is well known in the art, complete a circuit to illuminate an empty light advising a purchaser that the machine is empty.

It will be seen that the drive shaft 100 is rotated once for each deposit of coins of the proper denomination in the coin register. The inner end portion of the drive shaft 101 is provided with a transverse slot 160. A tongue 162 is formed on the end of a shaft 164 rotatably supported in a bearing 166 carried by the frame 44, as can readily be seen by reference to Figure 6. A Geneva drive cam 168 is mounted on shaft 164 for rotation therewith by key 170 and for longitudinal motion therewith. The drive member 168 is formed with a collar 172 adapted to be engaged by the forked end 174 of a shifting member 178 provided with a handle 180, as can readily be seen by reference to Figure 6. When the handle 180 is moved to the left the forked end 174 will be moved to the right. This will shift the drive member 168 along the shift 164. This motion brings the locking section 182 of the drive member 168 out of engagement with the scalloped portions 184 of the Geneva wheel 90. At the same time the driving pin 186 carried by the driving member 168 will be moved clear of the periphery of the Geneva wheel 90. When the driving member is clear of the Geneva wheel the drum can be freely rotated. This enables the compartments of the rows to be loaded. It is to be understood, of course, that in loading the machine the lock 18 is unlocked and the cover 12 is opened to give free access to the drum. The bearings 42 by which the drum shaft ends 40 are rotatably mounted are open at the top so that with the Geneva drive member disengaged and the cover opened the drum can readily be removed by lifting it upwardly. To permit this to take place readily the plate 46 upon which the sliding cover members 52 are mounted is pivoted about a rod 67, as can readily be seen by reference to Figure 7.

With the parts in the engaged position as shown in Figure 6 each rotation of the drive shaft 100 will rotate the shaft 164 correspondingly. This carries the Geneva drive member 168 around in a clockwise direction, as viewed in Figure 5. The initial rotation of the drive member will maintain the Geneva wheel stationary. When the driving pin 186, however, engages the adjacent slot 92 the locking member 182 will have cleared the inverted scallop 184. Thus the Geneva wheel will be under the control of the driving pin 186 and the slot 94. This will permit the Geneva wheel to be stepped around through one tooth, as is well known in the art of intermittent Geneva motions. As soon as the Geneva wheel has been stepped around through its proper amplitude of motion the locking member 182 will again engage the adjacent inverted scallop 184 and lock the drum in its new position. The motion of the drum brings an adjacent compartment containing merchandise into register with the openings 48 and 14, enabling a purchaser to lift the lid 16 and remove the merchandise.

By reference to Figure 5 it will be seen that a plurality of heating resistances 53 energized from any appropriate source of power through conductors 51 and 52' are provided. The function of the heating resistances is to prevent frost from forming on top of the sliding covers 52 which will prevent them from being urged to retracted position under the influence of respective springs 58 when the latch controlling a cover is moved clear of the depending portion of the cover.

In operation, the cover 12 is unlocked through the lock 13 and the cover opened. The hinged panel 46 supporting the sliding covers 52 is lifted upwardly pivoting around shaft 87. During this action all of the covers, of course, will snap back, since their depending portions will be free of the latches 64. The handle 180 is used to operate the shifting member 178 to shift the drive cam 168 to the right as viewed in Figure 6 clear of the Geneva wheel secured to the drum. The drum is now free to rotate. Frozen comestibles are loaded in the compartments in the drum. The lower portion of the drum is formed with a semicylindrical baffle 25 adapted to keep comestibles within the compartments from falling out of them. The semicylindrical baffle is supported in any appropriate manner from the frame 44. After the compartments are loaded with frozen comestibles the drive cam member 168 is again shifted to engage the Geneva wheel. The ratchet wheel 124 is moved so that it will be in a position to count the number of pieces of confection carried by the drum. The pawls 126 and 122 are lifted manually to permit the ratchet wheel to be moved to its correct position, it being understood that the ratchet wheel may be provided with appropriate calibrating marks (not shown). After the drum is loaded and the ratchet wheel counter moved to its proper position and the Geneva wheel of the drum engaged with the driving cam, the hinged cover panel 46 is moved to closed position and all of the covers moved manually to the front of the machine by hand. It is to be understood, of course, that before this is done the camshaft 72 is moved manually to bring the cams into position where they will trip the cover latches in succession, starting from the right of the machine and going toward the left. After all the slidable covers have been latched, the machine cover 12 is closed and locked. The machine is now ready for operation. Upon deposit of coins in the coin mechanism the motor 18 will be energized, driving the shaft 100 through the sprocket chain 114. The cam 106 insures that one complete revolution of the drive shaft will occur. Each revolution of the drive shaft will step the ratchet wheel 124 around in a counter-clockwise direction, as viewed in Figure 2, one tooth. The drive shaft 100 will drive the shaft 101 through the coupling 102. The shaft 101 will rotate the shaft 164, which, through spline 170, will drive the Geneva cam 168. This will step the drum around one compartment, bringing a compartment containing frozen comestibles under the opening 14. The hinged cover 16 is lifted by hand and the purchaser reaches in and is enabled to remove the frozen comestible. After a row of compartments has been emptied, that is, when the drum makes one complete revolution, the pin 84 will step the camshaft 72 around through one tooth of the ratchet wheel 88. This brings the first cam 82 into contact with the pin 80 of the first cover latch which is disposed over the second row of compartments and releases the first cover, making the second row of compartments available for removal of merchandise as the articles are stepped around through the Geneva motion in successive operations. The processes are repeated and upon each complete revolution of the drum, a succeeding cover is unlatched. After the last purchase, that is, when the last compartment of the last row is brought into register with the merchandise-removing opening, the pin 144 on the ratchet wheel 124 will make contact with the member 150 to operate the switch 148 to interrupt the motor circuit and to energize an empty signal light (not shown).

It will be observed that in case of a "meltdown" occasioned by loss of refrigeration, the entire drum can be readily lifted out of the refrigerated compartment so that the whole interior of the compartment can be cleaned in a simple, rapid and expeditious manner.

It will be seen that we have accomplished the objects of our invention. We have provided an improved merchandising machine for frozen comestibles which has a large capacity and which is easy to load and convenient to clean. We have provided a machine for vending frozen comestibles which is inexpensive to construct and simple in operation, the merchandise being held in compartments in a single moving drum which is stepped around by a Geneva motion.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. In a merchandising machine for frozen comestibles, an enclosed refrigerated cabinet having a top, a drum, means for mounting the drum within the cabinet for rotation about a horizontal axis, said drum being formed with a plurality of axially disposed rows of radially extending compartments, the top of the cabinet being formed with an elongated opening extending substantially parallel to the axis of the drum and having a width generally equal to the width of a drum compartment, a plurality of covers, means for mounting the covers for sliding movement within the cabinet across the elongated opening and over respective rows of drum compartments, means for biasing the covers to slide to a position clear of the longitudinal opening to permit access therethrough to a drum compartment, latches for holding the covers against the action of the biasing means in position blocking access to the drum compartment thereunder, means for intermittently rotating the drum to bring successive drum compartments into register with the elongated opening and means responsive to successive revolutions of the drum for releasing the cover latches in succession.

2. A merchandising machine as in claim 1 in which said means for intermittently rotating the drum includes a Geneva wheel mounted on the drum for rotation therewith, a Geneva cam coacting with said Geneva wheel and means for rotating the Geneva cam.

3. A merchandising machine as in claim 1 in which said means responsive to successive revolutions of the drum for releasing the cover latches in succession includes a cam shaft, a plurality of cams positioned upon said cam shaft displaced longitudinally from each other, each of said cams being radially displaced from an adjacent cam, a ratchet wheel carried by the cam and means carried by the drum adapted to engage the ratchet wheel once during each revolution of the drum.

4. A merchandising machine as in claim 1 in which said means for intermittently rotating the drum includes a Geneva wheel carried by the drum for rotation therewith, a shaft, means for rotating the shaft, a Geneva cam carried by the shaft for rotation therewith and for sliding movement with respect thereto and means for slidably shifting the Geneva cam into engagement and out of engagement with the Geneva wheel, the construction being such that when the Geneva cam is out of engagement, the drum may be freely rotated.

5. A merchandising machine as in claim 1 in which said means for intermittently rotating the drum includes an electric motor, a circuit for energizing the electric motor and means responsive to a predetermined rotation of the drum for interrupting the motor circuit.

6. In a merchandising machine, an enclosed cabinet formed with an elongated opening, a drum, means for mounting the drum within the cabinet for rotation about an axis extending generally parallel to said elongated opening, said drum being formed with a plurality of axially disposed rows of radially extending compartments, said elongated opening having a width generally equal to the width of a drum compartment, a plurality of covers, means for mounting the covers, means for sliding movement within the cabinet between the elongated opening and the respective rows of drum compartments, means for biasing the covers to slide to a position clear of the elongated opening to permit access therethrough to a drum compartment, latches for holding the covers against the action of the biasing means in position blocking access to the drum compartments, means for intermittently rotating the drum to bring successive drum compartments into register with the elongated opening and means responsive to successive complete revolutions of the drum for releasing the cover latches in succession.

CHRISTIAN GABRIELSEN.
WILMAR R. POST.

No references cited.